Sept. 12, 1933.　　　　G. BROULHIET　　　　1,926,260
MOTION DAMPER AND SHOCK ABSORBER
Filed Oct. 15, 1931　　　3 Sheets-Sheet 1
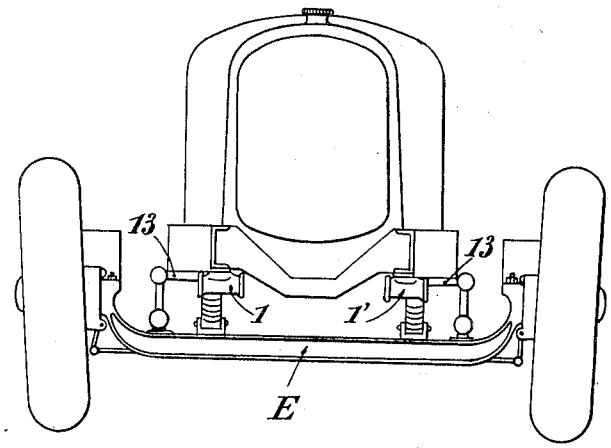
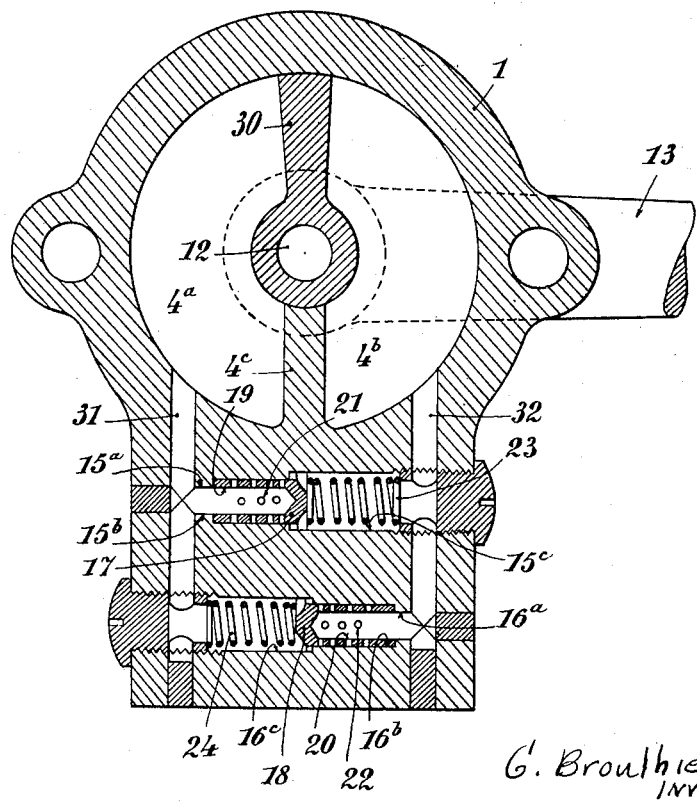
G. Broulhiet
INVENTOR
By: Marks & Clerk
Attys.

Sept. 12, 1933.                G. BROULHIET                1,926,260
                       MOTION DAMPER AND SHOCK ABSORBER
                        Filed Oct. 15, 1931      3 Sheets-Sheet 2

G. Broulhiet
INVENTOR

By: Marks & Clerk
        Attys.

Sept. 12, 1933.  G. BROULHIET  1,926,260
MOTION DAMPER AND SHOCK ABSORBER
Filed Oct. 15, 1931   3 Sheets-Sheet 3

G. Broulhiet
INVENTOR

By: Marks & Clark
ATTYS.

Patented Sept. 12, 1933

1,926,260

UNITED STATES PATENT OFFICE 1,926,260

MOTION DAMPER AND SHOCK ABSORBER

Georges Broulhiet, Paris, France

Application October 15, 1931, Serial No. 569,059, and in France October 24, 1930

8 Claims. (Cl. 188—89)

It is well known that aperiodic damping of an oscillating motion can be obtained whenever the resistance that the damping device opposes to said motion is constantly proportional to the instantaneous speed of the oscillation, the factor of proportion being at least equal to a predetermined value, which is found through well known calculations.

The object of my invention is a hydraulic damping device, in which the resistance to motion is strictly proportional to the speed of displacement of the suspended mass, this insuring the damping of the motion in the first quarter of the oscillation, whatever may be the amplitude of the displacement with respect to the position of equilibrium, the damping force being zero when the speed is zero.

The damping device according to my invention comprises a piston and a cylinder, the relative displacement of which is, through their construction, proportional to the displacement of the suspended mass whose movement is to be made aperiodic. Either a cylindrical piston, or a circular shutter, or any other organ equivalent to a piston forcing a liquid through a given orifice may be employed. The instantaneous output of such a device is proportional to the instantaneous speed of displacement of the piston, or similar organ, so that, by regulating the output, the speed of displacement of the piston, or similar organ, viz. the desired damping, may be regulated.

Said output Q is the product of the flow section S and the velocity of flow V. $Q = V \times S$.

It is well known that the velocity of flow V, through an orifice of constant section, is proportional to the square root of pressure $h$.

$$V = K\sqrt{h},$$

K being a constant factor,

If, in particular, the flow section S be proportional to the square root of pressure $h$, then:

$$S = K'\sqrt{h},$$

K' being another constant factor,

The output will be:

$$Q = VS = K\sqrt{h} \times K'\sqrt{h} = KK'h.$$

Therefore, an output proportional to the pressure and, consequently, a resistance proportional to the speed of displacement of the lever will have been obtained.

However, in a general way, the device according to my invention makes it possible to produce a resistance to displacement starting from zero value, or, even, from a given positive value, when the speed of displacement is zero, and increasing with the speed, according to a predetermined law, continuously and without limitation, or as the case may be, up to a predetermined limit.

A remarkable feature of the damping device according to my invention, of the type above mentioned, viz. comprising a piston, or a movable wall, discharging a liquid, lies in the fact that the device is so arranged that, in both directions of displacement of the piston, or similar organ, the flow section of the liquid varies according to a formula $$(S = K'\sqrt{h}),$$

or according to any other increasing function of the flow pressure to be obtained.

Preferred embodiments of my invention will be hereinafter described with reference to the accompanying drawings, given merely by way of example and in which:

Fig. 1 is a diagrammatic elevational view, on a small scale, of two damping devices, according to my invention, fitted to a motor car;

Fig. 9 is a sectional view of another embodiment of my invention, comprising a shutter.

Figure 2:
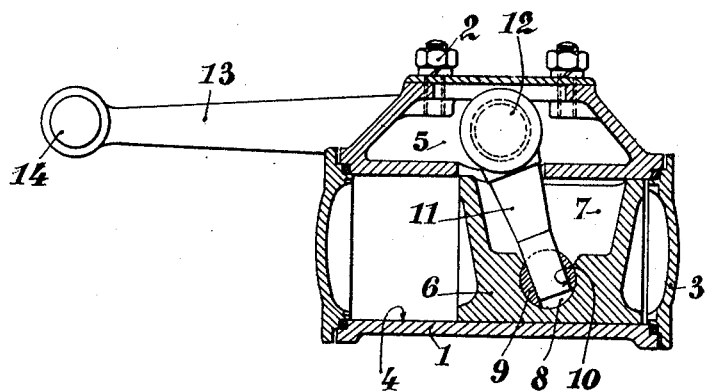
Fig. 2 is a longitudinal sectional view of one of said damping devices.
Figure 3:
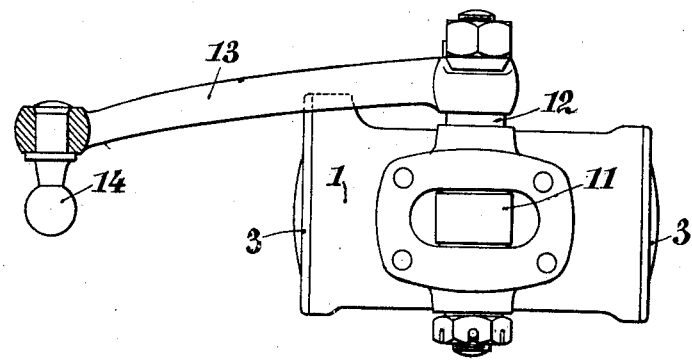
Fig. 3 is a plan view of the same.

As shown in Fig. 1, each damping device comprises a frame, which is secured to the chassis of the car in any appropriate manner, for example, by bolts 2 extending throughout frame 1 (Fig. 2).

In Fig. 2, frame 1 comprises a cylinder 4, on the top of which is placed a chamber 5, which contains a reserve of liquid. A piston 6 is fitted in cylinder 4, said piston being provided with a central recess 7, below which is bored a hole 8 containing a cylindrical part 9, which serves as a joint. Part 9 is provided with a bore 10, in which the extremity of a lever 11 is freely engaged. Said lever 11 extends through recess 7 and is keyed to a spindle 12, located in the upper part of the frame, and extends across chamber 5. On said spindle 12, and on the outside of the frame, another lever 13 is keyed, which is parallel to the frame and is provided, at its extremity, with a ring 14, connected by a suitable connecting rod, which is visible in Fig. 1, with axle E of the car.

In the body of piston 6 (Fig. 4) and on either side of its axis, are bored two series of holes of increasing diameters, 15a, 15b, 15c and 16a, 16b, 16c, the position of which is reversed with respect to one of the faces of the piston. In other words, hole 15a of the smallest section of one series is located on the same side as hole 16c of the largest section of the other series.

Figure 4:
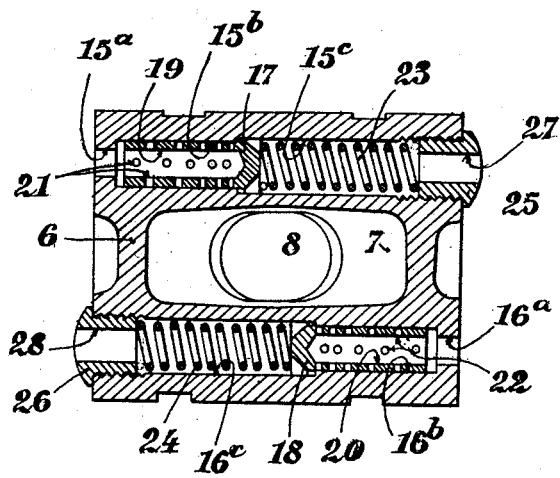
Fig. 4 is a horizontal sectional view, on a larger scale, of the piston alone.
Figure 6:
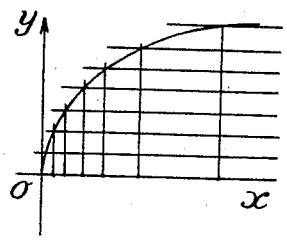
Figs. 6 to 8 are diagrammatic views which show the proper distribution of the outlets along each valve piston of the above mentioned damping device.
Figure 5:
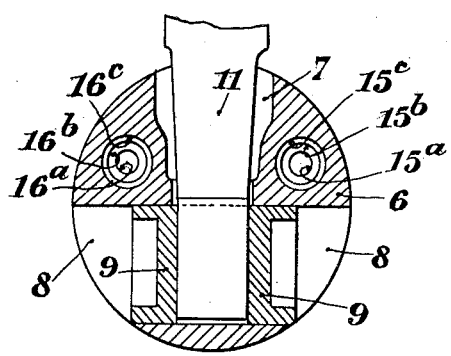
Fig. 5 is a cross section of the piston alone, on the same scale as Fig. 4.

The shoulders formed between bores 15b and 15c in one of the passages, 16b and 16c in the other, act as stops for two identical valve pistons 17 and 18, fitting without play in bores 15b and 16b. Said pistons 17 and 18 are provided with blind bores 19 and 20, into which open a series of unevenly distributed apertures 21 and 22, extending throughout the lateral walls of said pistons. Said apertures 21 and 22 may be, for instance, as shown in Fig. 4, at an increasing distance from each other, when going from the bottom of blind bores 19 and 20 toward their extremity.

To obtain the desired condition:

$$S = K'\sqrt{h},$$

which ensures a resistance proportional to the speed, a spacing of apertures 21 and 22 according to a parabolic law has been adopted in the example shown, that is to the distances of say, said apertures to a common origin are proportional to the abscissæ $x$ of points of a parabola whose ordinates $y$ are in arithmetical progression, the focal axis of said parabola coinciding with the axis of abscissæ.

Figure 7:
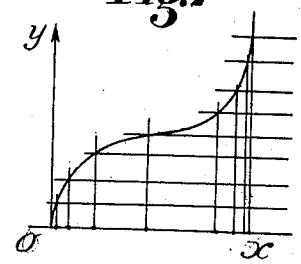

If it is desired that the resistance to the flow of liquid should be proportional to the speed only within a certain range of pressures, some of the apertures may be arranged according to a parabolic law of spacing, the corresponding diagram being a parabolic arc, connected, by a more or less curved arc (Fig. 7), with a line parallel with the ordinates $y$. Said curved line corresponds to a portion of the pistons where the apertures are disposed closer to each other than they would be if the parabolic law were applied to all apertures.

Figure 8:
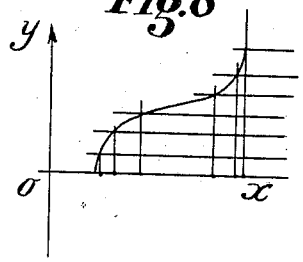

If the resistance to the flow of liquid should possess initially a certain positive value, the distances of the apertures to their common origin will be represented by a curve (Fig. 8) the origin of which is at a certain distance from the origin of the axis $ox$, $oy$ of coordinates.

Standard springs 23 and 24, free from tension when at rest, are located in holes 15c and 16c, beyond pistons 17 and 18, which move in opposite directions (Fig. 4). The extremities of said holes 15c and 16c are screw-threaded and provided with stoppers 25 and 26, provided with passages 27, 28, respectively (Fig. 4). Springs 23 and 24 are chosen of such length and elasticity that they may be considerably shortened when subjected to a relatively small pressure, whereby relatively small variations of the fluid pressure will cause relatively great displacements of the valve members.

It will be readily understood that, as piston 17 or 18 moves forward in hole 15b or 16b, a connection will be established between apertures 15a and 27, or 16a and 28, through apertures 21 or 22 of the piston in question.

The device works as follows: when the axle of the car is displaced with respect to the chassis, levers 11 and 13 oscillate together and piston 6 is displaced in cylinder 4, which contains a liquid, such as oil for instance (Fig. 2).

If piston 6 is displaced from right to left (Fig. 4) the increasing pressure on its left side pushes forward valve piston 17 in groove 15b, thus overcoming the resistance of spring 23, and the liquid which passes through the piston is transferred on its right hand side, the reverse taking place when the piston is displaced from left to right.

Spring 23 or 24 regulates, by its compression, the pressure opposed to the displacement of piston 6, said pressure increasing, therefore, as valve piston 17 or 18 is being displaced. The pressure of the liquid and the tension of the spring are zero when the apparatus is at rest;

In moving forward, valve piston 17 or 18 discloses apertures 21 or 22, the number and spacing of which regulate the section of flow of the liquid as a function of the displacement and, therefore, of the pressure which is proportional to said displacement.

An aperiodic damping is thus obtained, both as regards the oscillating motion of the axle with respect to the chassis and the springing motion of the wheels on the ground.

Instead of being placed in the body of piston 6, valve pistons 17 and 18 may be located in passages bored through the cylinder frame.

It is preferable to establish the connection through the body of the piston, in the case of a cylinder and a piston, and through the frame of the cylinder when a shutter is employed, as shown in Fig. 9.

In the embodiment shown in Fig. 9, shutter 30 is keyed to pivoting axis 12 of lever 13.

Vertical passages 31 and 32 open respectively into cavities 4a and 4b of cylinder 4, said cavities being separated from one another by partition 4c and shutter 30. Vertical passages 31 and 32 may be connected with one another according to the direction of the rotary movement of the shutter, through one or the other of valve pistons 17 and 18, provided with apertures 21 and 22 and located in transversal stepped holes 15a, 15b, 15c and 16a, 16b, 16c respectively, as in the first embodiment.

The displacements of valve pistons 17 and 18 are opposed, as in the first embodiment, by standard springs 23 and 24, the tension of which is zero when at rest.

The device works as in the first embodiment, the only difference consisting in that the liquid is displaced by means a rotary shutter, instead of being displaced through a piston moving in a longitudinal direction.

Having now described my invention what I claim as new and desire to secure by Letters Patent is:

1. A motion damper, particularly adapted as shock absorber for the suspension of motor vehicles, comprising a fluid tight casing adapted to contain a fluid, a movable wall adapted to divide said casing into two chambers, two fluid passages between said chambers and means for controlling the flow of fluid through said passages, embodying two valve members arranged in said passages and subjected to the fluid pressures in said chambers, and flexible means counteracting said fluid pressures respectively, whereby relatively small variations of the fluid pressure will cause relatively great displacements of said valve members, said valve members being provided with fluid port means so arranged as to offer a variable flow section, in response to the fluid pressures in said chambers.

2. A motion damper, particularly adapted as shock absorber for the suspension of motor vehicles, comprising a fluid tight casing adapted to contain a fluid, a movable wall adapted to divide said casing into two chambers, two fluid passages between said chambers, and means for controlling the flow of fluid through said passages, embodying two valve members respectively arranged in said passages and subjected to the fluid pressures in said chambers and flexible springs counteracting said fluid pressures respectively, whereby relatively small variations of the fluid pressure will cause relatively great displacements of said valve members, said valve members being provided with fluid port means so arranged as to offer a variable flow section, in response to the fluid pressures in said chambers.

3. A motion damper, particularly adapted as shock absorber for the suspension of motor vehicles, comprising a fluid tight casing adapted to contain a fluid, a movable wall adapted to divide said casing into two chambers, two fluid passages, each comprising a small diameter bore and a larger diameter bore, a hollow piston slidably arranged in each of said small diameter bores, the closed end of said piston facing the larger bore, fluid port means in the cylindrical wall of said pistons disposed along the length of said pistons and adapted to be closed by the wall of said small diameter bore and to be gradually disclosed as said piston is moved by the fluid pressure into said larger bore whereby said fluid port means offer a flow section variable with the fluid pressure, and flexible means for counteracting said fluid pressure.

4. A motion damper as claimed in claim 1, wherein said fluid port means are so arranged that the flow section varies as the square root of the fluid pressure.

5. A motion damper as claimed in claim 3, wherein said fluid port means comprise unequally spaced holes.

6. A motion damper as claimed in claim 3, wherein said fluid port means comprise unequally spaced and dimensioned holes.

7. A motion damper as claimed in claim 1, wherein said fluid passages are formed through said movable wall.

8. A motion damper particularly adapted as shock absorber for the suspension of motor vehicles comprising a fluid tight cylindrical casing adapted to contain a fluid, a radial partition in said casing, a lateral boss projecting from said casing, a rotary blade pivoted in the axis of said casing and adapted to be constantly in fluid-tight contact with said casing and partition, two fluid passages in said boss and connecting said chambers, and means for controlling the flow of fluid through said passage, embodying two valve members respectively arranged in said passages and subjected to the fluid pressures in said chambers, and flexible means counteracting said fluid pressures respectively, whereby relatively small variations of the fluid pressure will cause relatively great displacements of said valve members, said valve members being provided with fluid port, means so arranged as to offer a variable flow section, in response to the fluid pressures in said chambers.

GEORGES BROULHIET.